United States Patent [19]

Hamada et al.

[11] Patent Number: 4,878,079

[45] Date of Patent: Oct. 31, 1989

[54] FOCUS DETECTING DEVICE

[75] Inventors: Masataka Hamada, Osaka; Toshihiko Karasaki, Sakai; Toru Matsui, Sakai; Yukio Maekawa, Sakai, all of Japan

[73] Assignee: Minolta Camera Kabushiki Kaisha, Osaka, Japan

[21] Appl. No.: 226,932

[22] Filed: Aug. 1, 1988

Related U.S. Application Data

[63] Continuation of Ser. No. 85,410, Aug. 14, 1987, Pat. No. 4,768,052.

[30] Foreign Application Priority Data

Aug. 18, 1986 [JP] Japan ............................. 61-191682

[51] Int. Cl.$^4$ .............................................. G03B 3/00
[52] U.S. Cl. .................................... 354/402; 354/286
[58] Field of Search ............... 354/400, 402, 406, 407, 354/408, 286, 195.1, 195.12, 432

[56] References Cited

U.S. PATENT DOCUMENTS

| | | | |
|---|---|---|---|
| 4,306,787 | 12/1981 | Fukuhara et al. | 354/432 |
| 4,473,287 | 9/1984 | Fukuhara et al. | 354/409 |
| 4,474,449 | 10/1984 | Kusuka | 354/408 |
| 4,477,164 | 10/1984 | Nakai et al. | 354/286 |
| 4,537,487 | 8/1985 | Taniguchi et al. | 354/286 |
| 4,687,917 | 8/1987 | Kusaka et al. | 354/408 |
| 4,743,932 | 5/1988 | Matsui | 354/407 |
| 4,768,052 | 8/1988 | Hamada et al. | 354/402 |

FOREIGN PATENT DOCUMENTS

| | | |
|---|---|---|
| 56-101128 | 8/1981 | Japan . |
| 57-210326 | 12/1982 | Japan . |
| 59-129810 | 7/1984 | Japan . |
| 59-146028 | 8/1984 | Japan . |
| 59-208514 | 11/1984 | Japan . |

Primary Examiner—Russell E. Adams
Attorney, Agent, or Firm—Burns, Doane, Swecker & Mathis

[57] ABSTRACT

A focus detecting device capable of correcting an error, between an in-focus position of a photographic lens detected by a focus detecting means and an image field position affording the best image. Focus detection is made using plural focus detecting areas provided on and off the optical axis of the photographic lens, to obtain an in-focus position. Then, the thus-obtained in-focus position of the photographic lens is corrected using an appropriate correction value out of those preset and stored in a ROM in the lens according to whether the focus detecting area used in the focus detection is an axial or off-axial area, or according to the focal length of the photographic lens as well as the photographing mode. And the photographic lens is thereby set to the best image field position.

18 Claims, 12 Drawing Sheets

FOCUS DETECTING DEVICE

This application is a continuation of application Ser. No. 085,410, filed Aug. 14, 1987, now U.S. Pat. No. 4,768,052.

BACKGROUND OF THE INVENTION

1. Field of the Invention

The present invention relates to a focus detecting device of high accuracy for use in a camera or the like, having a plurality of focus detecting areas and capable of correcting an error between an in-focus position of lens detected by focus detecting means and a best image field position.

2. Description of the Prior Art

In a condition in which a plurality of objects are located within an objective field to be photographed, photographers often require to obtain a photograph in which both of a main object and a secondary object located at the background of the main object are reproduced sharply. However, such requirement can not be satisfied by conventional auto-focus camera provided with an automatic focusing device which controls the photographic lens to focus only one object located within the objective field.

To satisfy such requirement, there has been proposed an automatic focusing device in which the focus detection is performed with respect to a plurality of divided areas of the object field, and the focusing condition of the photographic lens is controlled in accordance with a plurality of focus detection results so that all of the detected objects can be reproduced on the image plane within the depth of focus of the photographic lens, or so that a closest object detected can be reproduced sharply on the image plane. The latter is based on a consideration that the main object to be focused is likely to be located at a position closest to the camera among the plurality of detected objects. Such automatic focusing device are proposed, for example, by Japanese Laid-Open Patent Application Nos. 101128/81 and 146028/84.

As well known, however, a photographic lens has various kinds of aberrations, including spherical aberration, astigmatism and field curvature. Beside, due to the influence based on the direction of arrangement of automatic focus detecting elements, when there is made focus adjustment for a photographic lens in accordance with an output signal from a focus detecting element disposed in a position deviated from the central position among many focus detecting elements arranged on the photographing image plane, there occurs a deviation between the in-focus position detected by the automatic focus detecting elements and the best image field position of the photographic lens.

Figure 1:
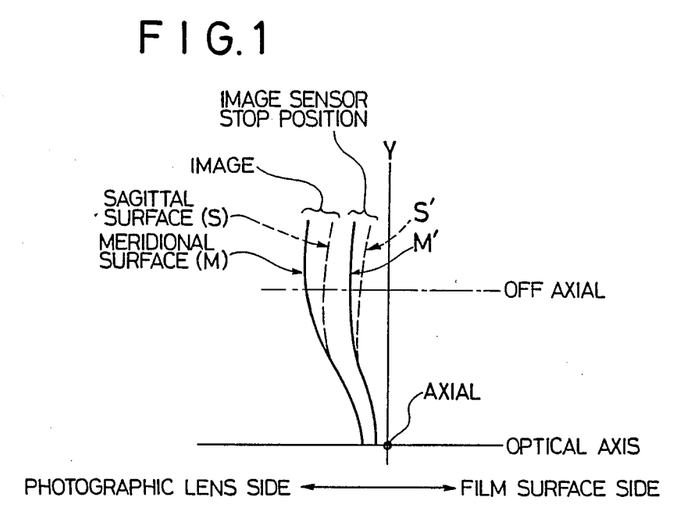
FIG. 1 is a diagram showing a relation between an in-focus position detected by an image sensor and a best image field position based on aberration of a photographic lens.

This is as shown in FIG. 1, in which the axis of abscissa X extends along an optical axis, the left-hand side being a photographic lens side and the right-hand side, a film surface side, and the axis of ordinate Y represents the distance from the optical axis.

In FIG. 1, the position indicated as "axial" is a position in which there is obtained the best imaging performance of an image formed by an axial light (incident light parallel to the optical axis of the photographic lens). The said position is usually called "the best axial position". In a camera, however, it is not desirable to locate the film surface in "the best axial position" because the aberrations generated by an off-axial light (incident light having inclination with respect to the optical axis) would be deteriorated. According to the conventional construction, therefore, the film surface is located not in "the best axial position" but in a position slightly deviated therefrom. The aberration curve represented as "image" in FIG. 1 indicates the magnitude of deviation (in full open aperture condition, e.g. F=2.0) of the actual photographic lens transmitted light including both axial light and off-axial light with respect to "the best axial position". It is the best image contrast position.

On the other hand, in an automatic focus detecting device, the focus detection is performed by sensing only the light passing through a portion close to the optical axis of a photographic lens, namely, a portion where the aperture value is large (e.g. F=5.6), so the aberration correction performance on the focus detecting device becomes superior to that of the entire photographic lens. And in the use of a focus detecting sensor (hereinafter referred to as "image sensor"), the focusing condition of the photographic lens is adjusted to a position close to "the best axial position" as indicated as "image sensor stop position" in FIG. 1.

Thus, the lens stop position ("image sensor stop position") detected as an in-focus position by the image sensor deviates from the best image contrast position ("image" position) and this deviation increases as the distance from the optical axis becomes longer.

In view of the above point there has been proposed an automatic focus control device (see Japanese Patent Laid-Open Patent Application No. 208514/84) in which the in-focus position data provided from the image sensor is corrected with spherical aberration data of a photographic lens to correct an error from the best image field position.

The above proposed correction for the in-focus position of a photographic lens intended to correct errors based on the properties peculiar to the photographic lens such as, for example, spherical aberration of the lens. Of course, such correction of errors based on the properties peculiar to the photographic lens is important, but in order to set the photographic lens in the best image position more accurately it has been necessary to decide an optimum correction value according to the focal length of the photographic lens as well as the exposure mode which is determined by the combination of shutter speed and aperture value, and correct the in-focus position of the photographic lens using the said correction value.

SUMMARY OF THE INVENTION

It is an object of the present invention to provide a focus detecting device having a plurality of focus detecting areas and capable of correcting an error between an in-focus position of a photographic lens detected by a focus detecting means and an image field position which affords the best image.

It is another object of the present invention to provide a focus detecting device having a plurality of focus detecting areas located on and off an optical axis, and capable of correcting an error between a detected in-focus position and a best image affording image field position with respect to the said focus detecting regions.

It is a further object of the present invention to provide a focus detecting device which corrects a detected in-focus position according to the focal length of a photographic lens as well a an exposure mode which is determined by the combination of shutter speed and aperture value.

The above and other objects and features of the present invention will appear more fully hereinafter from a consideration of the following description taken in conjunction with the accompanying drawings illustrating embodiments of the present invention by way of example.

DETAILED DESCRIPTION OF THE PREFERRED EMBODIMENTS

Before describing below embodiments of the present invention, the principle of correction of an error between an in-focus position of a photographic lens detected by an image sensor and a best image affording position will first be explained.

FIG. 2 shows, in terms of corresponding positions in a finder image, examples of arrangement of image sensors for effecting focus detection in each of plurally divided areas of a photographic field, that is, so-called multi-divided focus detection. And FIG. 3 shows a relation between the direction of light incident on a photographic lens L and the position of an image sensor S.

The light on and near the optical axis is incident on an image sensor disposed at the center of the photographic field, while off-axial light is incident on an image sensor disposed away from the center of the image plane. Each of image sensors detects the luminance distribution of respective divided areas.

Figure 4:
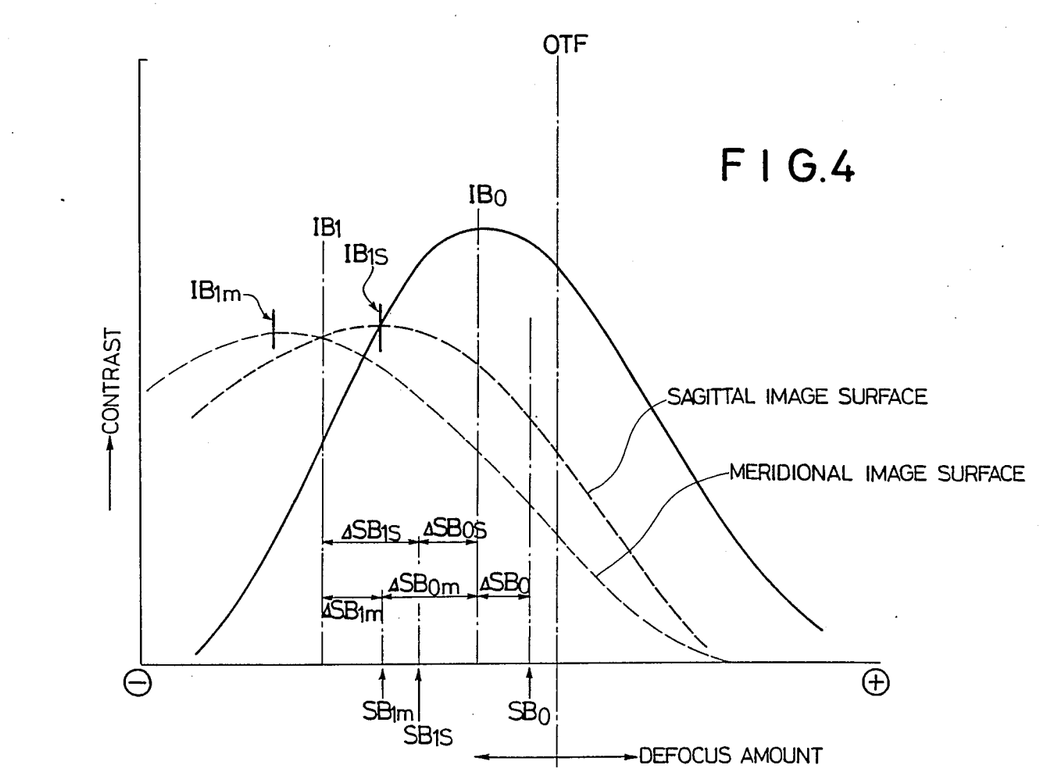
FIG. 4 is a diagram showing a relation between defocus amounts on and off the photographic lens optical axis and contrast.

FIG. 4 shows an example of defocus amount on and off the optical axis of a photographic lens vs. contrast curves (Optical Transfer Function [OTF]) at a predetermined spatial frequency (e.g. 50 pcs/mm), in which $IB_0$ represents a maximum contrast position or a best image position on the optical axis and $SB_0$ represents a detected in-focus position with an image sensor located on the optical axis.

Figure 2A:
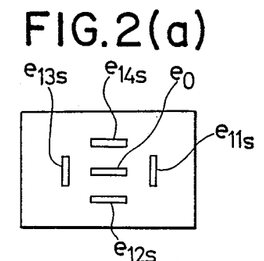
FIGS. 2(a), (b), (c), (d), (e) and (f) are diagrams showing examples of arrangement of focus detecting areas in a photographic image plane.
Figure 2B:
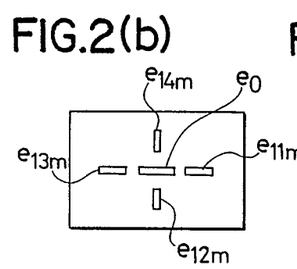
Figure 2C:
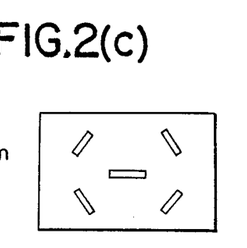
Figure 2D:
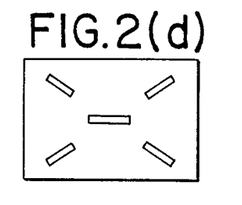
Figure 2E:
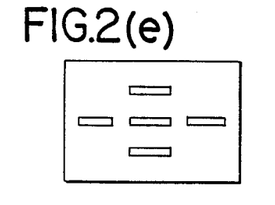
Figure 2F:
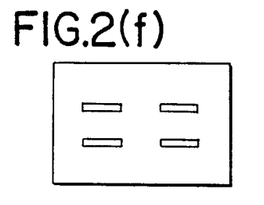
Figure 3A:
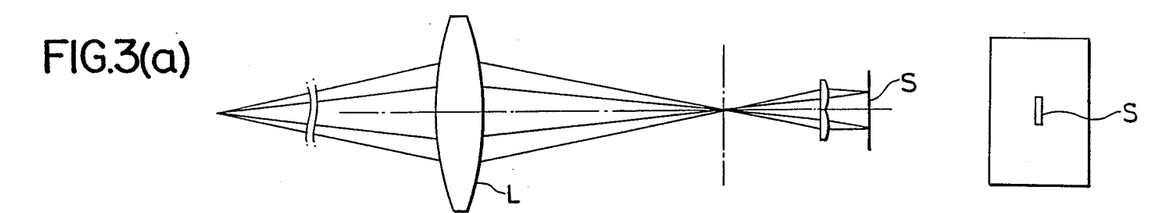
FIGS. 3(a), (b), and (c) are diagrams showing relations between incident light on and near the optical axis of a photographic lens as well as incident light from off the optical axis and the location of an image sensor for the detection thereof.
Figure 3B:
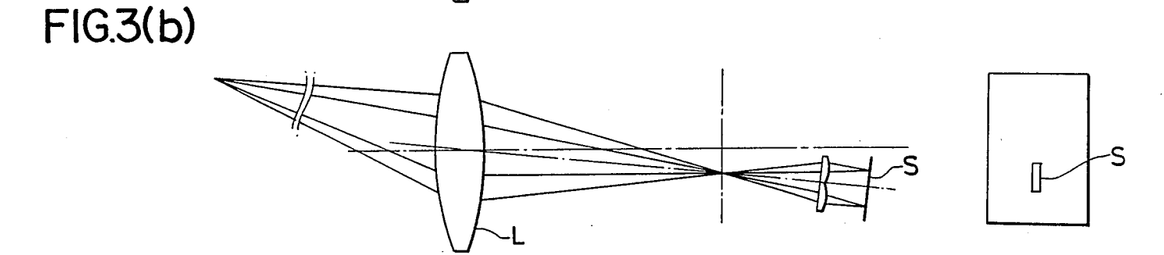
Figure 3C:
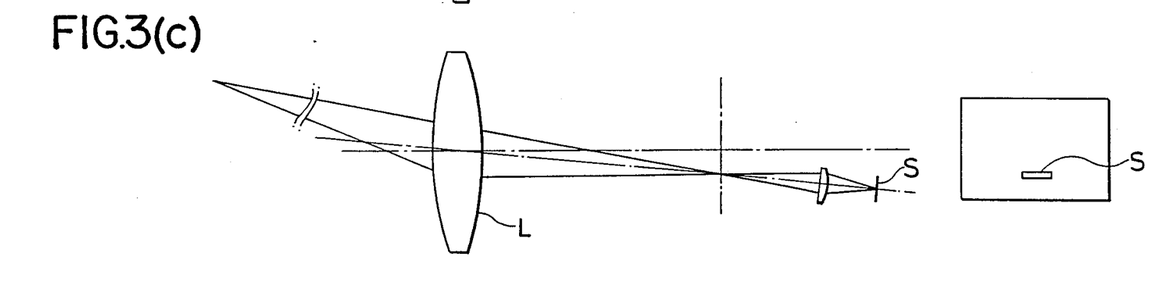

In the arrangement of image sensors shown in FIG. 2(a), the lens stop position (in-focus position) detected by the focus detection device corresponds to the position of $SB_0$ in FIG. 4 when focus detection is made with the sensor located in an area $e_0$ on and near the optical axis. But since the best image field position on the optical axis is $IB_0$, it is possible to obtain the best image by giving $\Delta SB_0$ as an amount of correction to the photographic lens to correct the lens position.

When focus detection is made with the sensor located in an area $e_{11s}$ off the optical axis in the arrangement of image sensors shown in FIG. 2(a), the lens stop position detected by the focus detection device corresponds to the position of $SB_{1s}$ in FIG. 4 unlike previous example due to astigmatism of lens or field curvature thereof. In this case, there are various methods for correcting the lens position as well as various amounts of corrections, according to purposes of photographing. Examples are as follows:

(a) Giving an amount of correction $\Delta SB_{1s}$ to the photographic lens to obtain the best image quality in and near the focus detecting area $e_{11s}$. (This is an intermediate point between a sagittal image surface best position $IB_{1s}$ and a meridional image surface best position $IB_{1m}$.)

(b) Giving an amount of correction $\Delta SB_{0s}$ to the lens to obtain the best image quality on and near the optical axis different from the focus detecting area.

(c) Giving to the lens a predetermined amount of correction, e.g.

$$\frac{m\Delta SB_{1S} + n\Delta SB_{0S}}{m + n}$$

wherein m and n are positive constants.

(d) Changing the amount of correction according to the focal length of the photographic lens. For example, where the lens has a short focal length, there is made uniform weighting to effect uniform focusing in an image plane because of a scenery image in many cases, while when the lens has a long focal length, weighting is made at the central portion preponderantly because the object is clear, e.g. in the case of portrait photographing. And the following amounts of correction are given to the lenses.

(i) When the image sensor $e_0$ on the optical axis is selected for detecting the focusing condition:
Long focal length lens: $-\Delta SB_0$
Short focal length lens: $-\Delta \Delta SB_0 - \frac{1}{2}(\Delta SB_{1s} + \Delta SB_{0s})$ (ii) When the image sensor $e_{11s}$ located off the optical axis is selected for detecting the focusing condition:
Long focal length lens: $+\Delta SB_{0s}$
Short focal length lens: $+\Delta SB_{0s} - \frac{1}{2}(\Delta SB_{1s} + \Delta SB_{0s})$ FIG. 5 is a conceptual diagram showing the arrangement of focus detecting optical systems in the application of the focus detecting device of the present invention to a single lens reflex camera.

Figure 5:
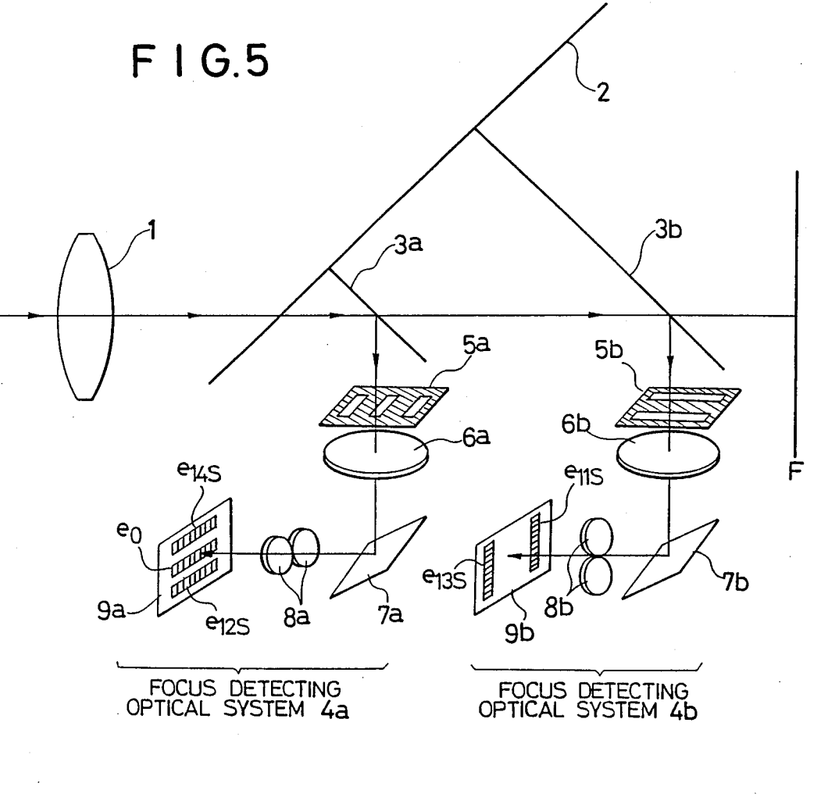
FIG. 5 is a diagram showing arrangements of focus detecting optical systems.

In FIG. 5, numerals 1 and 2 denote a photographic lens and a main mirror, respectively; numerals 3a and 3b denote sub mirrors provided behind the main mirror 2; numerals 5a and 5b denote field masks; numerals 6a and 6b denote condenser lenses; numerals 7a and 7b denote total reflection mirrors numerals 8a and 8b denote respective pairs of re-imaging lenses; and numerals 9a and 9b denote image sensors each including a plurality of light receiving elements arranged in a direction. The elements 3a to 9a constitute a first focus detecting optical system 4a, while the elements 3b to 9b constitute a second focus detecting optical system 4b. The reference mark F represents the film surface.

Light from an object incident through the photographic lens 1 passes through the main mirror 2 and is reflected and divided by the sub mirrors 3a and 3b and conducted to the first and second focus detecting optical systems 4a and 4b provided in the lower portion of the camera. The divided incident light beams passed through the field masks 5a, 5b and condenser lenses 6a, 6b disposed in the vicinity of equivalent surface to the film surface F form images on the image sensors 9a and 9b by the condenser lenses 6a and 6b. In this embodiment, the exit pupil of the photographic lens is divided into three areas with respect to X axis, which correspond to the focus detecting areas $e_0$, $e_{12s}$ and $e_{14s}$ shown in FIG. 2(a). Also the exit pupil is divided into two areas with respect to Y axis perpendicular to the X axis, which correspond to the focus detecting areas $e_{11s}$ and $e_{13s}$.

On the image sensors 9a and 9b each constituted by a CCD and corresponding to the focus detecting areas $e_0$, $e_{12s}$, $e_{14s}$, $e_{11s}$ and $e_{13s}$ there are formed two object images on each of portions $e_0$, $e_{12s}$, $e_{14s}$, $e_{11s}$ and $e_{13s}$ by light transmitted through the field masks 5a and 5b, respectively. In this case, the spacing between the two images varies depending on whether the photographic lens is in in-focus condition or out-of-focus condition, and from the image spacing it is possible to determine a defocus amount of the photographic lens.

It is FIG. 2 that shows, in terms of corresponding positions in the finder image, in which positions on the photographic image plane the focus detecting areas are located. In addition to the arrangement of FIG. 2(a), the focus detecting areas may be arranged like (b), (c), (d) and (e) of the same figure. Further, the number of such areas may be four as shown in FIG. 2(f), or may be even three, two, six or more, though not shown.

Figure 6:
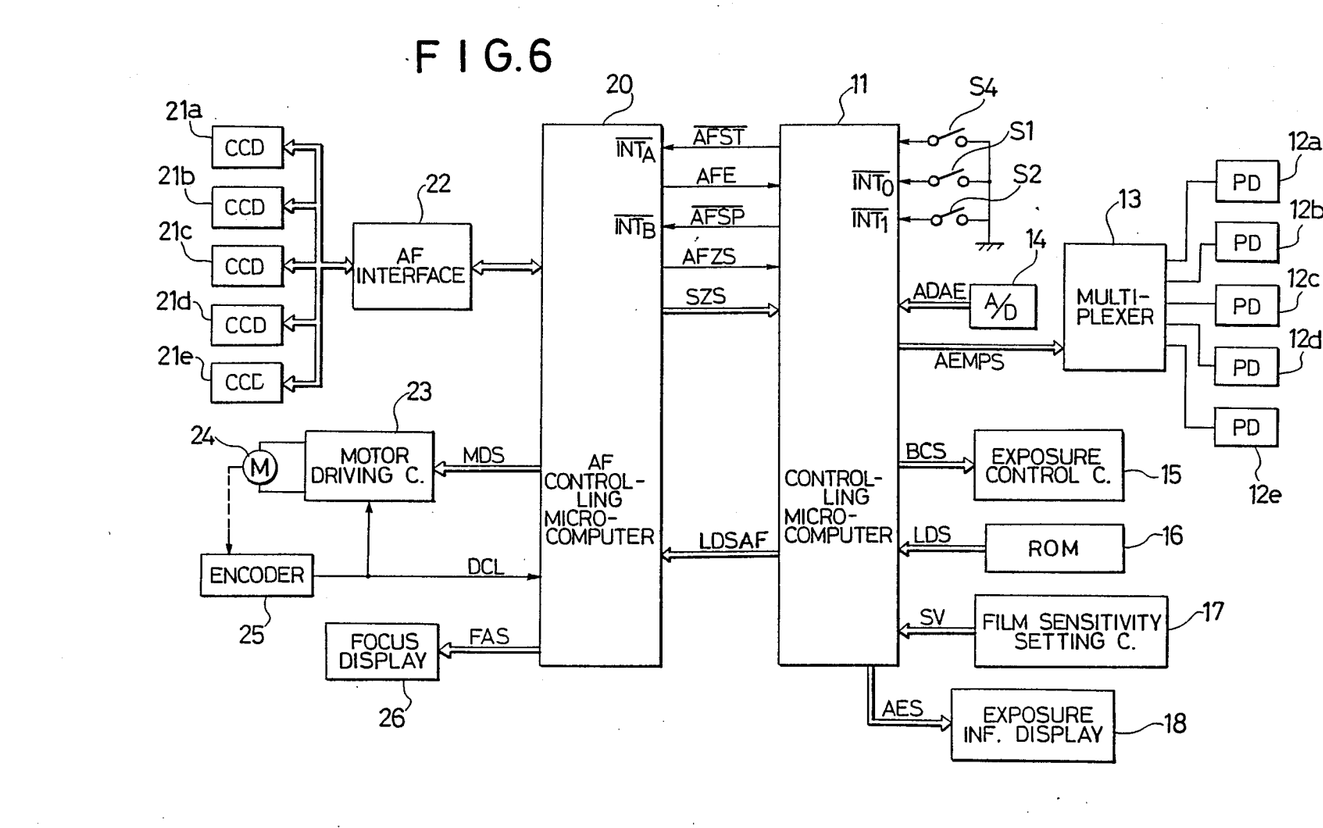
FIG. 6 is a circuit block diagram of a focus detecting system.

FIG. 6 is a circuit block diagram of a light measuring and focus detecting system of a single lens reflex camera incorporating therein the focus detecting device of the present invention. Its construction will first be explained below.

Numerals 11 and 20 denote a controlling microcomputer and an AF controlling microcomputer, respectively; numerals 12a to 12e denote light sensing elements for measuring light spot, comprising photo diodes disposed in correspondence to the focus detecting areas; numerals 13, 14 and 15 denote a multiplexer, an A-D converter and an exposure control circuit, respectively; numeral 16 denotes a read only memory (ROM) for storing various lens data necessary for automatic focusing (hereinafter referred to as "AF") control; numeral 17 denotes a film sensitivity setting circuit for setting a film sensitivity value SV required for exposure control; numeral 18 denotes an exposure information display section for displaying exposure data based on a calculated exposure value; $S_1$ denotes a light measuring and AF starting switch; $S_2$ denotes a release switch; and $S_4$ denotes a switch which is reset upon reset of the main mirror and upon completion of winding of the shutter curtains of a focal plane shutter.

The read only memory (ROM) 16 is provided in respective photographic lens. Additionally, the switch $S_1$ is closed in response to the depression of a shutter release button by a first stage, and the switch $S_2$ is closed in response to the depression thereof by a second stage deeper than the first stage.

Further, numerals 21a to 21e denote image sensors each constituted by a CCD; numeral 22 denotes an AF interface for driving the CCDs and transferring the outputs thereof to the AF controlling microcomputer 20; numeral 23 denotes a motor driving circuit; numeral 24 denotes a motor for moving the photographic lens to the in-focus position; numeral 25 denotes an encoder for detecting the number of revolutions of the motor 24; and numeral 26 denotes a focus display section for display whether the photographic lens is in in-focus or out-of-focus condition.

The operation of this focus detecting system will now be outlined. Upon turning ON of the light measuring and AF starting switch $S_1$ to start operation, one of the outputs from the light spot measuring elements 12a–12e is selected in accordance with a selection signal AEMPS provided to the multiplexer 13 from the controlling microcomputer 11 and it is converted to a digital value by the A-D converter 14, which digital value is fed to the controlling microcomputer 11. Such operation is repeated with respect to all of the light sensing elements 12a to 12e.

On the other hand, in accordance with a read signal provided from the controlling microcomputer 11, lens data LDSAF such as transformation coefficient for transforming the defocus amount calculated as a result of focus detection into an amount of lens shifting, maximum and minimum apertures values of the photographic lens, focal length, and an amount of correction to the best image field position (see FIG. 4), are fed to the controlling microcomputer 11 from the ROM 16 which contains those data.

Likewise, the film sensitivity value SV value necessary for the exposure control is fed from the film sensitivity setting circuit 17 to the controlling microcomputer 11 in accordance with a read signal provided from the microcomputer 11.

The controlling microcomputer 11 performs exposure calculation on the basis of those input data, and upon receipt of a release signal from the switch $S_2$, it outputs an exposure control signal BCS to the exposure control circuit 15 to operate an exposure control mechanism (not shown) to effect appropriate exposure. At the same time, the microcomputer 11 outputs an exposure information AES to the exposure display section 18 to make display.

The AF controlling microcomputer 20 drives CCDs 21a to 21e through the AF interface 22, received the outputs of the CCDs after A-D conversion and performs AF calculation on the basis of the received data to calculate a defocus amount. Out of the lens data LDS previously input to the controlling microcomputer 11, those required for AF have been transferred to the AF controlling microcomputer 20, so using the lens shifting transformation coefficient there is calculated an amount of lens shifting from the defocus amount. A drive signal MDS is provided to the motor driving circuit 23 to drive the motor 24 and the number of revolutions of the motor is detected by the encoder 25. Then, control is made to a predetermined amount of lens shifting while comparing the detected output with the amount of lens shifting calculated by the AF controlling microcomputer 20. And, for confirming in-focus state, an in-focus late signal FAS is provided to the focus display section 26 to make display.

The controlling operation of the controlling microcomputer will be explained below with reference to the flow chart of FIG. 7.

When the release button is depressed to the first stage and the light measuring and AF starting switch $S_1$ is closed, an interrupt signal is fed to an interrupt terminal $\overline{INT_0}$ the controlling microcomputer 11 (step #1). With this signal, the microcomputer 11 shifts from the stop mode to an operative state, brings an AF start signal $\overline{AFST}$ into "L" level and operates the AF controlling microcomputer 20 (step #2). Then, light measurement is started (step #3) and lens data LDS are read from the ROM 16 and SV data from the film sensitivity setting circuit 17 (step #4). Then, out of the data thus read, the data LDSAF required for AF are provided to the AF controlling microcomputer 20 (step #5). Further, the outputs of the light measuring elements are read (step #6).

Then, an AF area selection signal AFZS is input to the microcomputer 11 from the AF controlling microcomputer 20 and judgment is made as to whether the signal level is "H" or not (step #7). On this regard, a more detailed explanation will be given later, but here an explanation will be made with respect to the case of "L" because at the beginning of operation the signal level is "L".

When the AF area selection signal AFZS is "L", a mean value BVc of the outputs $BV_1$-$BV_5$ of the light measuring elements 12a-12e is calculated (step #8), then exposure calculation is made on the basis of the said mean value (step #11), and the result of the calculation is displayed on the exposure display section 18 (step #12).

Now, one loop of operations is completed and judgment is made as to whether the switch $S_1$ is kept depressed continuously or not (step #13). If the switch $S_1$ is ON, a check is made with the switch $S_4$ as to whether the main mirror has been reset and the winding of the shutter curtains completed or not (step #14), and a cheek is made also as to whether AF has been completed or not, using an AFE signal provided from the AF controlling microcomputer 20 (step #15). If AFE=H, the interruption to an interrupt terminal $\overline{INT_1}$ is permitted to permit turning ON or closing of the switch $S_2$ (step #16), and the program returns to step #4.

When the interruption to the interrupt terminal $\overline{INT_1}$ is permitted by turning ON or closing of the release switch $S_2$, interruption is applied to the interrupt terminal $\overline{INT_1}$ (step #24), an $\overline{AFSP}$ pulse is output (step #25), and the AF start signal $\overline{AFST}$ is made "H" to stop AF (step #26). Then, the main mirror is raised and the shutter curtains are controlled according to the shutter speed (step #27) to complete the exposure. Thereafter, the completion of reset of the main mirror and that of the shutter curtains are detected with the switch $S_4$ (step #28), whereupon the program shifts to step #13 to start the next processing.

When the switch $S_1$ is not ON in step #13, the program shifts to the processing from step #17 to #22, in which processing the light measuring operation is stopped, the exposure display is erased, an $\overline{AFSP}$ signal is provided to the AF processor 20 and the AF start signal $\overline{AFST}$ is rendered "H" to stop AF. Further, interruption to the interrupt terminal $\overline{INT_0}$ is permitted, while interruption to the interrupt terminal $INT_1$ is inhibited, to complete the processing.

The AF controlling operation of the AF controlling microcomputer 20 will now be explained with reference to the flow chart of FIG. 8. First, the AF start signal $\overline{AFST}$ provided from the controlling microcomputer 11 is fed to an interrupt terminal $\overline{INT_4}$ to bring the AF controlling microcomputer 20 into an operative state from its stop mode (step #30). The microcomputer 20 renders an AF end signal AFE "L", an AF area selection signal AFZS "L", tells the controlling microcomputer 11 that AF is in operation and that no AF area has been selected yet, and sets a low contrast flag F indicative of low contrast of the object to 1 (step #31). This flag is reset only when it was possible to effect focus detection with the previous CCD outputs. Here the flag is set because of the first processing.

Lens data LDSAF required for AF are input from the controlling microcomputer 11 (step #32).

Execution shifts to the control for CCDs. The CCDs are driven and their output are integrated (step #33). The integral is performed until the quantity of light reaches an appropriate level. Where the subject brightness is low, the integral is discontinued when a preset maximum integral time is reached, and the integrated data is input to the AF controlling microcomputer (step #34). This data processing is performed with respect to all of the light sensing elements, CCDs, 22a-22e corresponding to the five focus detecting areas which have been set.

Then, for deciding the priority of focusing condition calculation with the output signals provided from the five light sensing elements, CCDs, there are performed data preprocessing (step #35), precorrelation calculation (step #36), low contrast judgment (step #37), and deciding the priority of focus detection areas (step #38). These preprocessings involve a simple correlation calculation on each focus detecting area to select a focus detecting area which includes the nearest object. It is possible to shorten the long time required for performing the principal correlation calculation with respect to all the focus detecting areas.

The principal correlation calculation is performed in accordance with the priority thus decided by the above preprocessings (step #39). Then, judgment is made as to whether the contrast is low or not (step #40). In the case of a low contrast, the above processings are repeated with respect to the five focus detecting areas (step #41 and #42). When the low contrast is recognized in all of the five focus detecting areas, the program advances to step #43 and a check is made on the low contrast flag F. If the low contrast flag F has not been set to 1, the program returns to step #32 to start the focus detecting operation again. If F=1, it is considered that the defocus amount is outside the range which permits detection of an in-focus state since the distance between the photographic lens position and the object position is very large; therefore, the correlation calculation is repeated during one reciprocation of the lens position from the nearest photographic position up to infinity and lens scanning is executed to search the lens position which permits detection of the in-focus state (step #44).

On the other hand, when it is judged in step #40 that the contrast is not low, the program advances to step #45 to calculate the defocus amount. Then, the best image field position is corrected (step #46). This point will be explained in detail later. And the low contrast flap F is reset to zero so that the photographic lens position may not change in this state (step #47). By so doing, even if the next CCD integral value processing should result in judgment as low contrast, it is possible to effect the CCD integral again for all the focus detecting areas in that position and execute the correlation calculation without lens scanning (see step #44).

Then, the AF controlling microcomputer 20 brings the previously selected focus detecting area signal SZS and AF area selection signal AFZS into "H" level and outputs them to the controlling microcomputer 11 (step #48). In accordance with those signals the microcomputer 11 specifies a light measuring area.

Figure 7A:
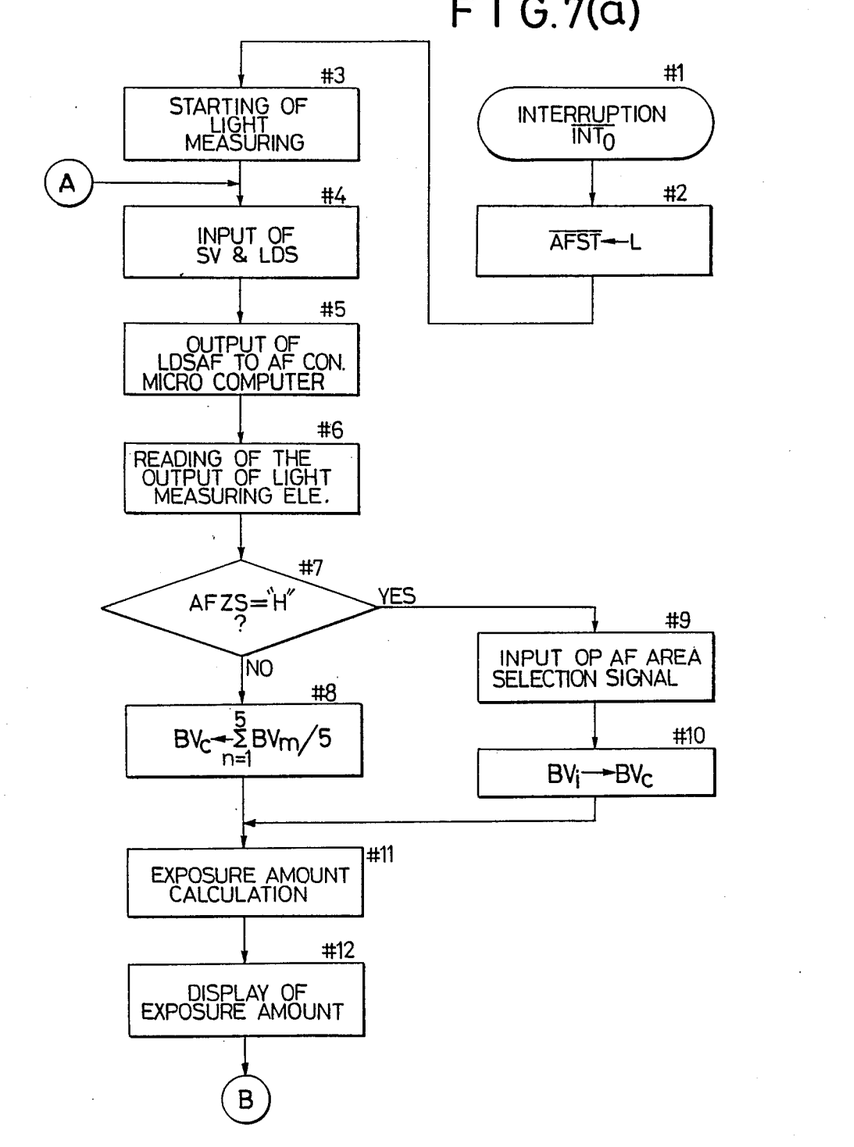
FIG. 7 is a flow chart of control operations performed by a controlling microcomputer.
Figure 7B:
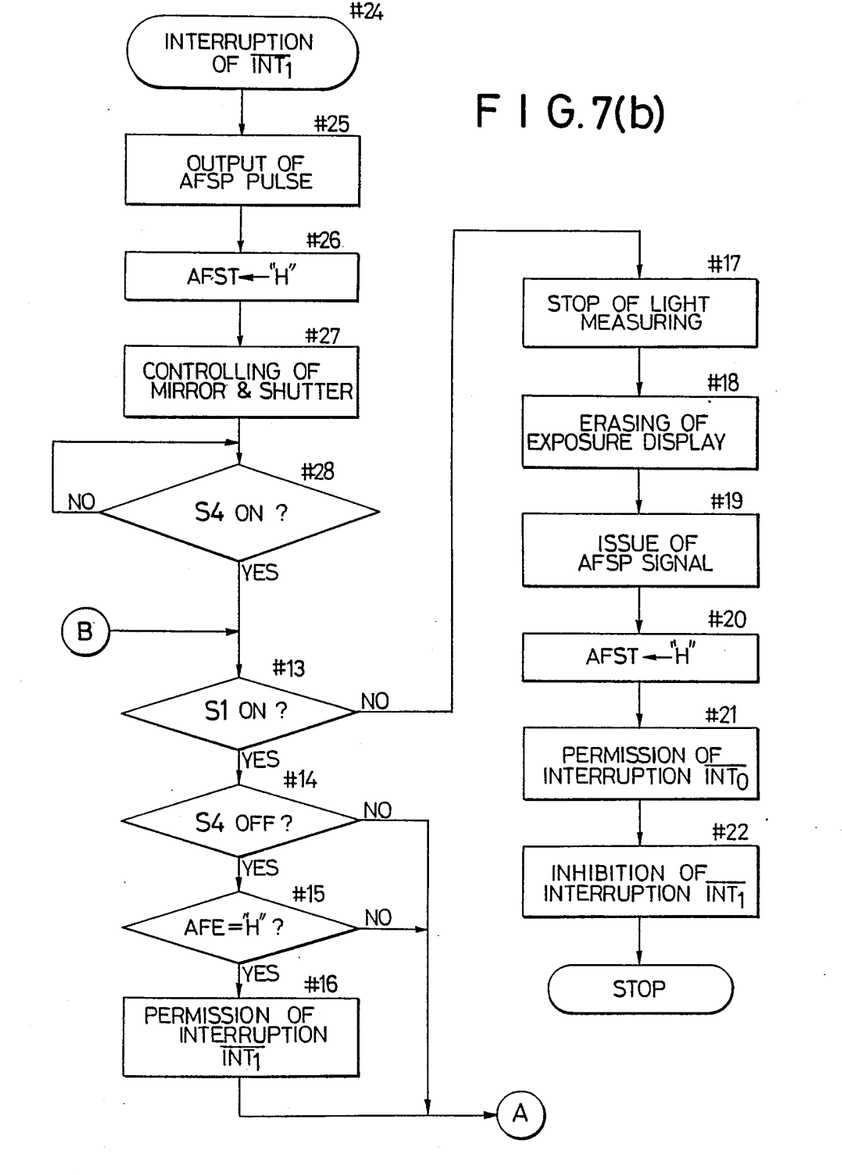

In step #7 in the controlling microcomputer processing flow shown in FIG. 7, the change in level to "H" of the AF area selection signal AFZS results in the program shifting to step #9 because the AF area selection signal AFZS is in H level. With the AF area signal SZS received there is provided an output $BV_i$ of the light measuring element corresponding to the specified light measuring area (step #10) and there is performed exposure calculation on the basis of the said output.

Figure 8A:
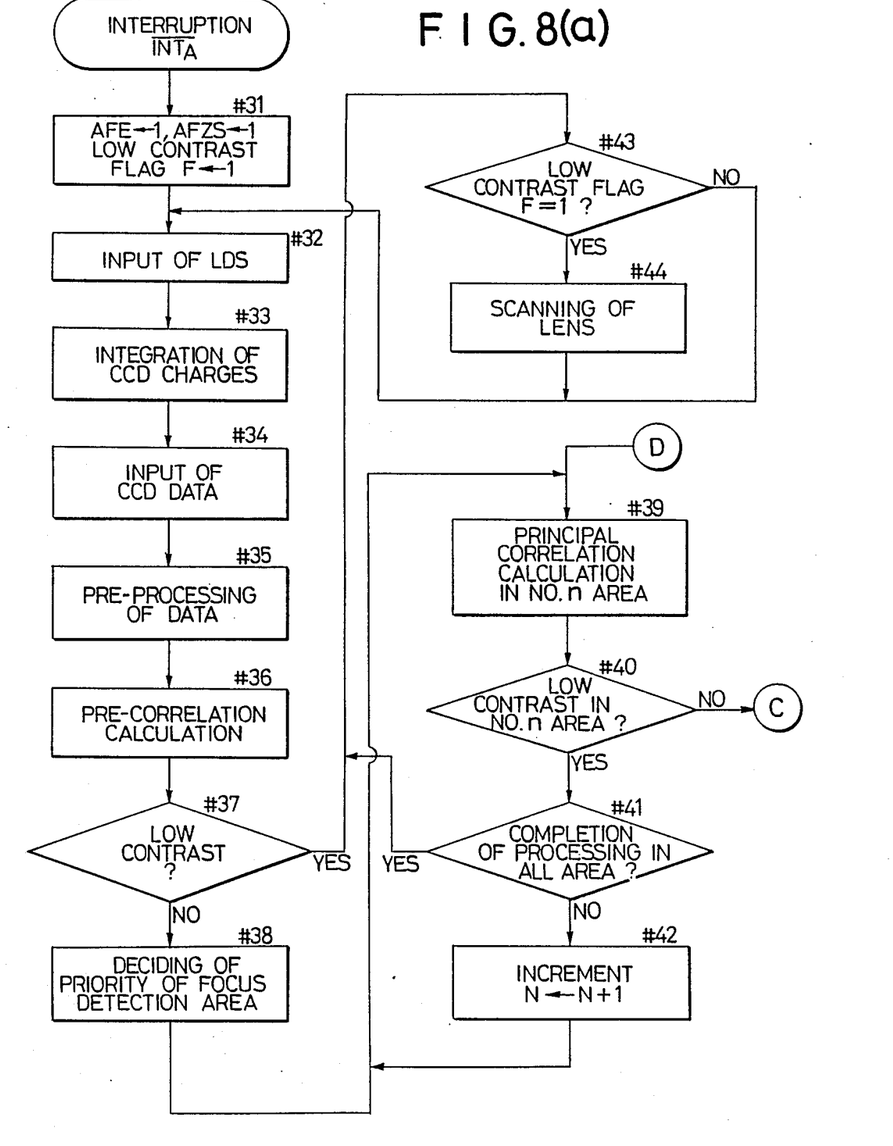
FIG. 8 is a flow chart of AF control operations performed by an AF controlling microcomputer.
Figure 8B:
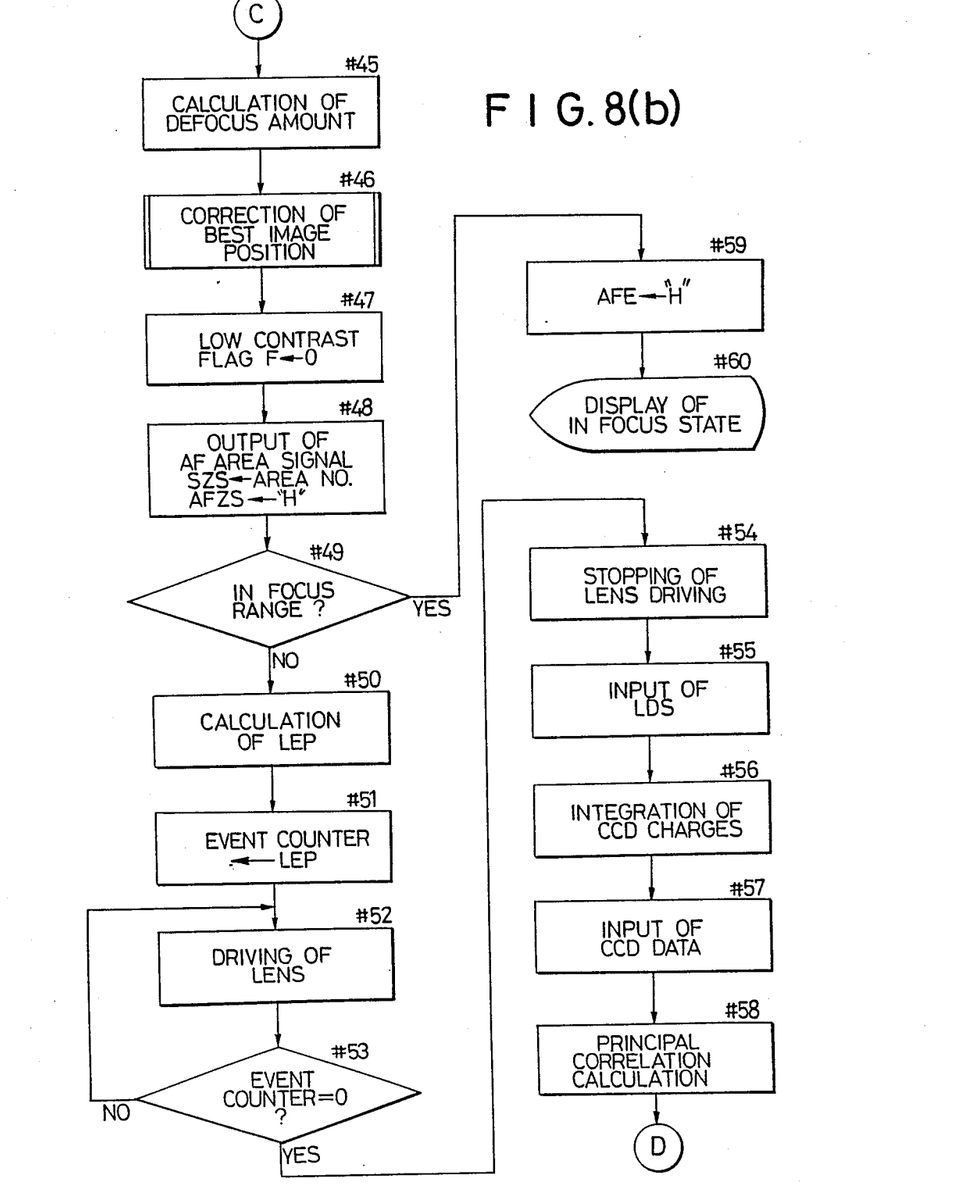

Turning back to the flow chart of FIG. 8, a check is made as to whether the defocus amount calculated previously is within a preset in-focus range or not (step #49). If the answer is affirmative, the AF end signal AFE is rendered "H" and output to the controlling microcomputer, urging the latter to permit release, and in-focus display is made on the focus display section 26 (step #59 and #60). When the defocus amount is found to be outside the in-focus range as a result of the judgment in step #49, the program advances to step #50, in which the number of lens driving pulses, LEP, is determined from both the defocus amount calculated previously and the lens shifting transformation coefficient out of the input lens data. Then, this number of pulses, LEP, is set to an event counter and the lens is driven until the counter contents become zero (step #51, #52 and #53).

When the contents of the event counter become zero, the lens driving is stopped (step #54). Thereafter, the AF controlling microcomputer 20 receives the lens data LDSAF necessary for AF, reintegrate CCD inputs and again checks whether the photographic lens is in in-focus or out-of-focus condition (step #55, #56, #57 and #58). In order to shorten the operation time, this processing is executed for the focus detecting area selected by the previous calculation.

If judgment should be mode at this stage to the effect that the contrast is low, then as previously noted, the lens position is left as it is and processing is restarted from the CCD integration with respect to all the focus detecting areas.

The following description is now provided about correcting the best image field position which is shown as step #46 in the flow chart of FIG. 8. It is here assumed that the focus detecting areas are arranged as shown in FIG. 2(a).

Figure 9:
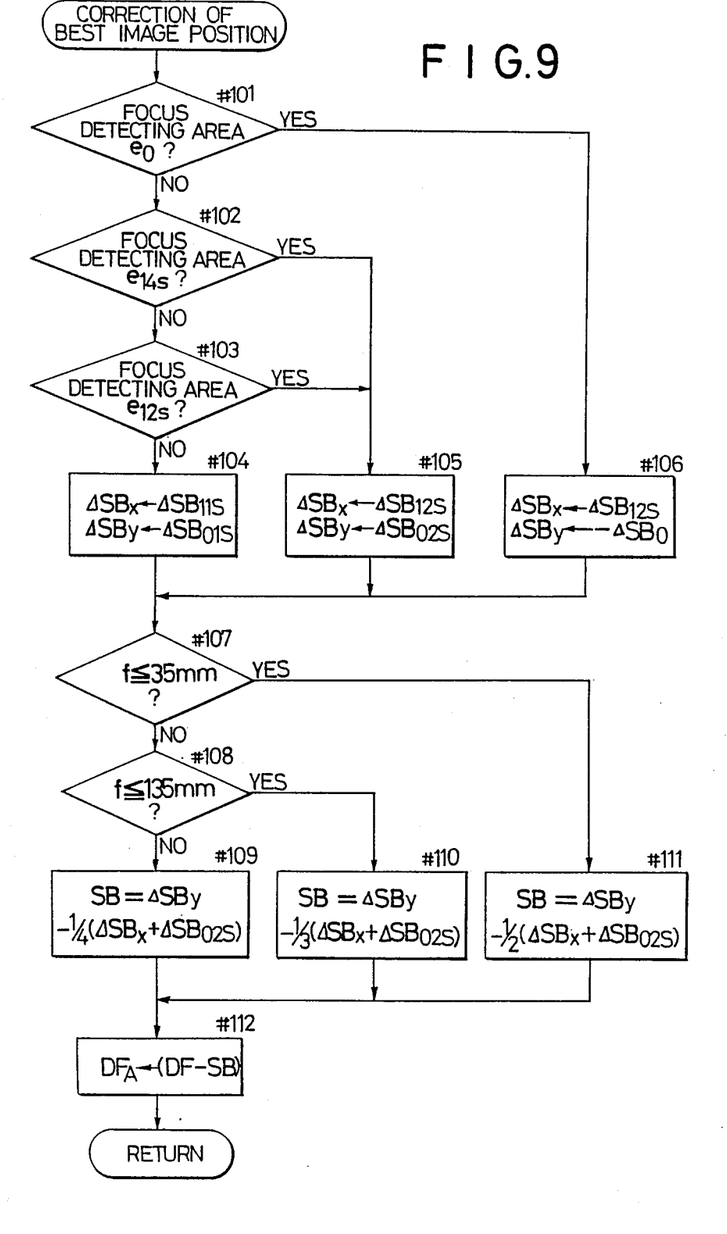
FIGS. 9 to 11 are flow charts of best image field position correcting processes.

In the first example shown in FIG. 9, in the case where an off-axial area is selected as a focus detecting area, the relation between the selected off-axial area and the axial area is balanced to determine a certain position as the best image field position and an amount of correction to the said position is determined. The weighting is changed depending on the focal length of the photographic lens. More particularly, when wide angle lens having a short focal length is used as a photographic lens, the weighting is determined so that all of the areas are considered uniformly because of scenery image in many cases. When telephoto lens having a long focal length is used as a photographic lens, the weighting is determined so that the axial area has highest weight because the main object is likely to be positioned on or near the optical axis.

The processing just referred to above will now be explained. A check is made as to which of $e_0$, $e_{14S}$ and $e_{12S}$ (see FIG. 2) is in use as a focus detecting area (step #101, #102 and #103). If the area $e_0$ on the optical axis is in use, the program advances to step #106, while in the case of an off-axial area, the program advances to step #105 when the direction of arrangement of a plurality of light receiving elements in the CCD image sensors is the same as that of the axial areas, but when the said arrangement direction is perpendicular to the direction of the axial areas, the program advances to step #104. If the off-axial focus detecting areas are equidistant from the optical axis and the direction of arrangement of the CCD image sensors is the same as that of those areas, it is not necessary to divide as above. On the other hand, if the arrangement direction of the focus detecting areas are all different from each other, it is necessary to perform separate processings.

In step #104, #105 and #106, there are determined deviation amounts $\Delta SBx$ and $\Delta SBy$ between the sensor-detected in-focus positions in X and Y directions and the best image field position.

Then, in step #107 and #108, the focal length, f, of the photographic lens is checked. When the focal length is not larger than 35 mm, the program advances to step #111; when it exceeds 35 mm and is not larger than 135 mm, the program advances to step #110; and when it exceeds 135 mm, the program advances to step #109, to determine the amount of correction SB, which is then subtracted from (or, as the case may be, added to) the defocus amount calculated previously to determine a defocus amount $DF_A$ from the best image field position (step #112).

The given constants $\Delta SB_{11S}$, $\Delta SB_{01S}$, $\Delta SB_{12S}$, $\Delta SB_{02S}$ and $\Delta SB_0$ are predetermined according to the photographic lens and they are read out from the ROM 16 incorporated in the lens and used.

Figure 10:
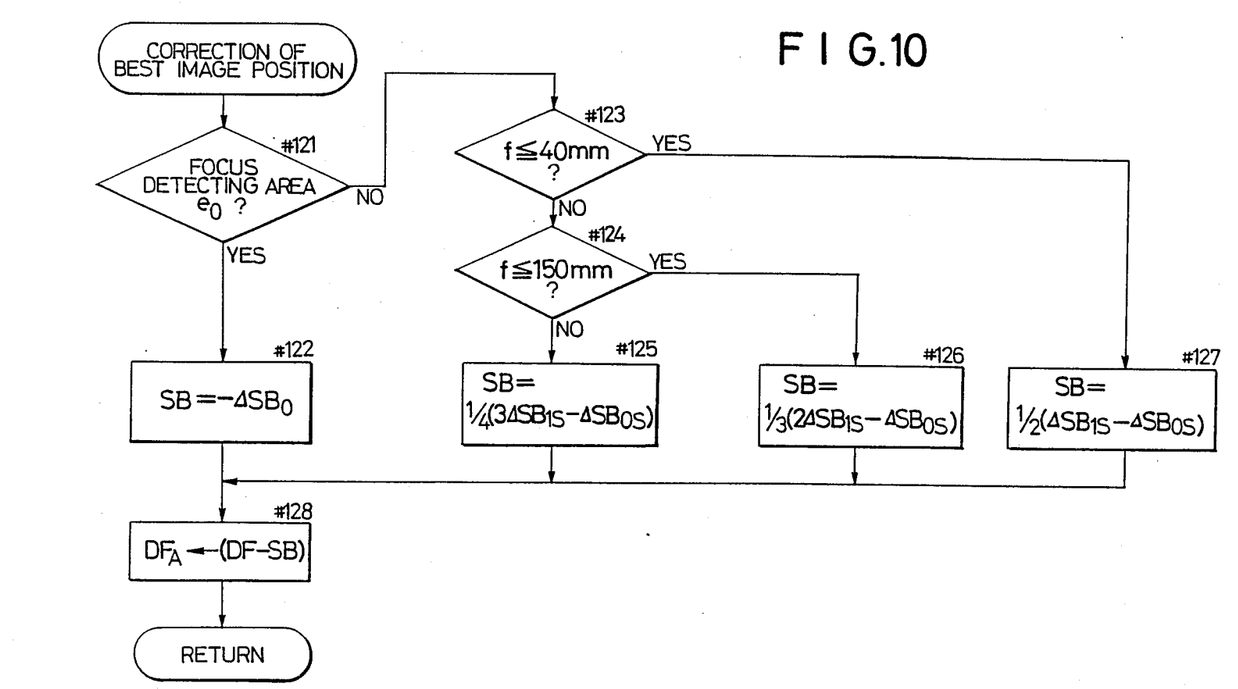

Referring now to FIG. 10, there is shown a second example of correction for the best image field position. In this example, a check is made as to whether the axial area $e_0$ is in use as a focus detecting area or not (step #121), and if the answer is affirmative, there is used an axial correction value $-\Delta SB_0$ as the amount of correction for obtaining the best image quality on and near the optical axis (step #122). When the focus detecting area used is an off-axial area, then like the first example, the focal length of the photographic lens is checked (step #123 and #124). In the case of a telephoto lens having a focal length exceeding 150 mm, there is made weighting at an axial area to off-axial area ratio of 3:1; in the case of a lens having a focal length in the range of 40 to 150 mm, there is made a 2:1 weighting and in the case of a lens not larger than 40 mm in focal length, a 1:1 weighting is made, and the amount of correction SB is determined (step #125, #126 and #127). Then, the defocus amount DF is corrected by the amount of correction SB to obtain a new defocus amount $DF_A$.

Figure 11:
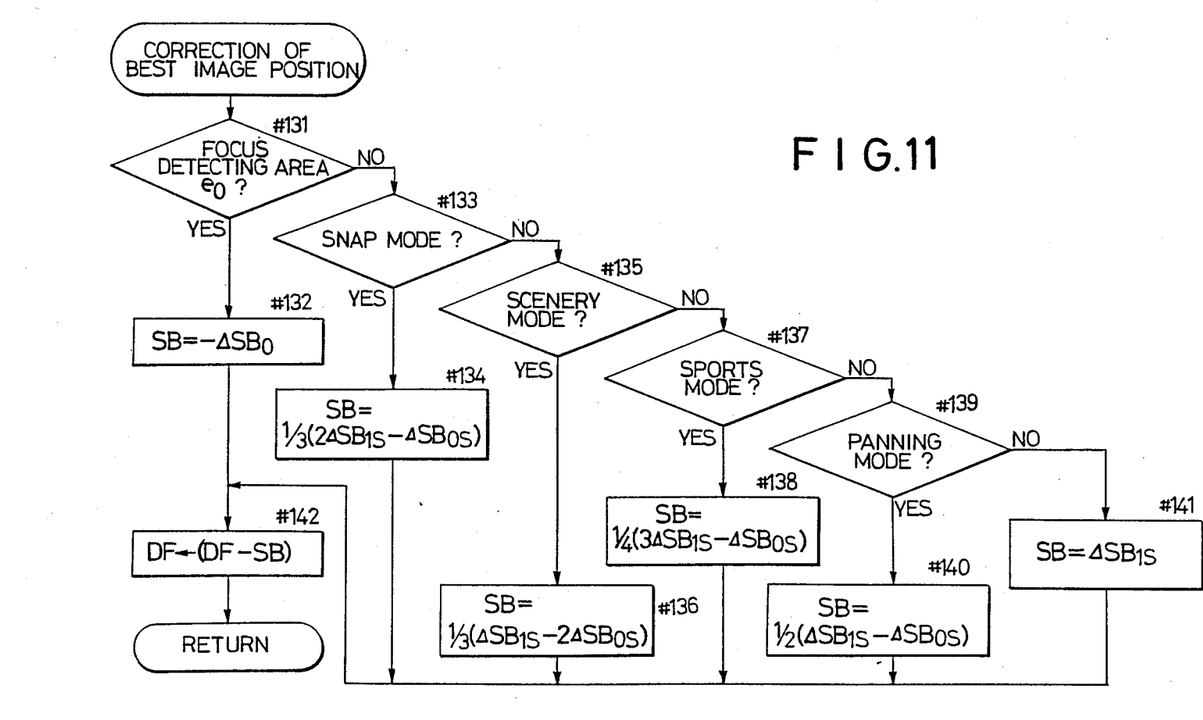

Referring now to FIG. 11, there is shown a third example of correction for the best image field position. In this example, a check is made as to whether the focus detecting area used is the axial area $e_0$ or not (step #131), and if the answer is affirmative, the axial correction value $-\Delta SB_0$ is used to obtain the best image quality on and near the optical axis (step #132). When the focus detecting area used is an off-axial area, the correction weighting is changed according to photographing (exposure) modes, which are classified as snap mode, scenery mode, sports mode, panning mode, etc. (step #133, #135, #137 and #139).

In the snap mode, weight is laid on a relatively axial area of the photographic image plane, so the processing is made at an axial/off-axial correction value of 2:1 (step #134). In the scenery mode, the processing is performed at an axial/off-axial correction value of 1:2 in order to improve the image quality of the central part (step #136). In the sports mode, the processing is performed at an axial/off-axial correction value of 3:1 because of moving objects (step #138). In this case, there may be adopted only the off-axial value like 1:0. The processing in the panning mode is conducted at an axial/off-axial correction value of 1:1 because it is presumed that the object covers the whole image area (step #140). In other modes, there are used off-axial correction values directly (step #141). Using the resulting correction value SB, the defocus amount DF is corrected (step #142).

In addition to the best image field correction described above, the method of adopting a correction value and the weighting ratio may be interlocked with the selection of each focus detecting area, or it will be possible to make direct input of a correction value using a best image field correcting change-over switch or the like.

Moreover, the above embodiment assumes that the focus detecting areas are arranged as in FIG. 2(a) and that the correction values are in the sagittal direction. But, when it is assumed that the off-axial focus detecting areas are arranged in the meridional direction, there may be used the corresponding correction values in the execution of the processing.

As set forth hereinabove, according to the focus detecting device of the present invention in which a photographic field is divided into plural areas and focus detection is made for each area, the weighting for the amount of correction is changed in consideration of the focal length of a photographic lens and the photographing mode at the time of correcting an error between an in-focus position of the photographic lens based on a focus detection signal for each area and the best image field position based on aberration of the lens in the focus detecting areas. Consequently, it is possible to obtain a high quality image conforming to the intention of the person who photographs.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A focus detection device for use in a camera system including an objective lens, comprising:
   means for measuring the luminance distribution of a plurality of divided areas of an objective field to be photographed to produce a plurality of luminance distribution signals in correspondence to said areas;
   means for producing a plurality of correction data signals each relating to aberrations of the objective lens in each area; and
   means for performing a focus detection calculation on the basis of the plurality of luminance distribution signals and the plurality of correction data signals to produce a resultant focus detection signal.

2. A focus detection device as claimed in claim 1, wherein the plurality of correction data signals are determined in accordance with respective distances from an optical axis of the objective lens to respective divided areas.

3. A focus detection device as claimed in claim 2, wherein the plurality of divided areas includes at least one axial area located on the optical axis and at least one off-axial area located far from the optical axis, and wherein the plurality of correction data signals includes at least one axial correction data signal corresponding to the axial area and at least one off-axial correction data signal corresponding to the off-axial area.

4. A focus detection device as claimed in claim 2, wherein the plurality of correction data signals are determined on the basis of respective best image position in respective divided areas.

5. A focus detection device as claimed in claim 4, wherein the focus detection calculation performing means includes means for calculating a focus condition of the objective lens with respect to the off-axial area in accordance with the axial correction data signal determined on the basis of the best image position in the axial area.

6. A focus detection device as claimed in claim 4, wherein the focus detection calculation performing means includes means for calculating a focus condition of the object lens with respect to the off-axial area in accordance with a position predetermined between a best image position in the axial area and a best image position in the off-axial area.

7. A focus detection device as claimed in claim 2, wherein the plurality of divided areas includes a plurality of off-axial areas apart from the optical axis by an identical distance, and wherein the plurality of correction data signals corresponding to the plurality of off-axial areas are identical to each other.

8. A focus detection device as claimed in claim 1, wherein the correction data signals producing means includes a ROM provided in the objective lens.

9. An objective lens attachable to a camera body, comprising:
   means for producing a plurality of correction data signals each relating to aberrations of the objective lens in a plurality of divided areas of an objective field to be photographed, said plurality of correction data signals to be used for detection a focus condition of the objective lens in the camera body to which the objective lens is attached; and
   means for sending the plurality of correction data signals to the camera body which the objective lens is attached.

10. An objective lens attachable to a camera body as claimed in claim 9, wherein the plurality of correction data signals are determined in accordance with respective distances from an optical axis of the objective lens to respective divided areas.

11. An objective lens attachable to a camera body as claimed in claim 10, wherein the plurality of divided areas includes at least one axial area located on the optical axis and at least one off-axial area located far from the optical axis, and wherein the plurality of correction data signals includes at least one axial correction data signal corresponding to the axial area and at least one off-axial correction data signal corresponding to the off-axial area.

12. An objective lens attachable to a camera body as claimed in claim 10, wherein the plurality of correction data signals are determined on the basis of respective best image positions in respective divided areas.

13. An objective lens attachable to a camera body as claimed in claim 12, wherein the plurality of divided areas includes at least one off-axial area located far from the optical axis, and wherein a correction data signal corresponding to the off-axial area is determined on the basis of a best image position in the off-axial area.

14. An objective lens attachable to a camera body as claimed in claim 12, wherein the plurality of divided areas includes at least one axial area located on the optical axis and at least one off-axial area located far from the optical axis, and wherein a correction data signal corresponding to the off-axial area is determined in accordance with a position predetermined between a best image position in the axial area and a best image position in the off-axial area.

15. An objective lens attachable to a camera body as claimed in claim 10, wherein the plurality of divided areas include a plurality of off-axial areas apart from the optical axis by an identical distance, and wherein the plurality of correction data signals corresponding to the plurality off-axial ares are identical to each other.

16. An objective lens attachable to a camera body as claimed in claim 9, wherein the correction data producing means includes a ROM provided in the objective lens.

17. A focus detection for use in a camera system including an objective lens, comprising:
    means for measuring the luminance distribution of a plurality of divided areas of an objective field to be photographed to produce a plurality of luminance distribution signals in correspondence to said areas;
    means for producing a plurality of correction data signals each relating to aberrations of the objective lens in each area;
    means for selecting one of the plurality of divided areas; and
    means for performing a focus detection calculation on the basis of a luminane distribution signal of the selected area and a correction data signal corresponding to the selected area to produce a resultant focus detection signal.

18. A focus detection device as claimed in claim 17, wherein the focus detection calculation performing means includes means for calculating a focus condition on the basis of the luminance distribution signal of the selected area to produce a focus detection signal, and means for correcting the focus detection signal in accordance with the correction data signal corresponding to the selected area to produce the resultant focus detection signal.

* * * * *